(12) United States Patent
Chaudhuri et al.

(10) Patent No.: US 11,055,344 B2
(45) Date of Patent: Jul. 6, 2021

(54) PRODUCT IMAGE EVALUATION SYSTEM AND METHOD

(71) Applicant: Walmart Apollo, LLC, Bentonville, AR (US)

(72) Inventors: Abon Chaudhuri, Sunnyvale, CA (US); Ajinkya More, Sunnyvale, CA (US); Alessandro Magnani, Menlo Park, CA (US); Paolo Messina, San Jose, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 103 days.

(21) Appl. No.: 16/360,496

(22) Filed: Mar. 21, 2019

(65) Prior Publication Data

US 2019/0294627 A1 Sep. 26, 2019

Related U.S. Application Data

(60) Provisional application No. 62/646,170, filed on Mar. 21, 2018.

(51) Int. Cl.
*G06F 16/538* (2019.01)
*G06Q 30/06* (2012.01)
(Continued)

(52) U.S. Cl.
CPC ............ *G06F 16/538* (2019.01); *G06F 7/08* (2013.01); *G06F 16/55* (2019.01); *G06Q 30/0643* (2013.01)

(58) Field of Classification Search
CPC .......... G06F 16/538; G06F 7/08; G06F 16/55; G06F 16/58; G06Q 30/0643
See application file for complete search history.

(56) References Cited

U.S. PATENT DOCUMENTS

| 7,801,893 B2 | 9/2010 | Gulli' et al. |
| 8,090,222 B1* | 1/2012 | Baluja ............... G06F 16/951 382/305 |

(Continued)

FOREIGN PATENT DOCUMENTS

| CN | 106708951 A | 5/2017 |
| WO | WO 2015184992 A1 | 12/2015 |

OTHER PUBLICATIONS

International Search Report and Written Opinion for PCT Application No. PCT/US19/23357 dated Jul. 23, 2019; 11 pages.

*Primary Examiner* — Ryan F Pitaro
(74) *Attorney, Agent, or Firm* — Bryan Cave Leighton Paisner LLP

(57) ABSTRACT

A product image evaluation system. In embodiments, the system comprises or interacts with a product database comprising a product information record that comprises a product identifier and a product category for a product, and an image database comprising a plurality of candidate images for the product. In embodiments the image database can comprise images received from a plurality of different sources. The system can comprise a parameterized grouping engine configured to separate images into groups of similar images, an image selector configured to select one or more images from each group, and an image sorter configured to determine an order of the selected images. Embodiments can distill the superset of all available images to provide a set of images that are "sufficiently different" from each other and satisfy quality requirements. As a result, no images containing unique information are left behind, and images containing duplicate or irrelevant information are discarded.

20 Claims, 5 Drawing Sheets

(51) Int. Cl.
*G06F 7/08* (2006.01)
*G06F 16/55* (2019.01)

(56) References Cited

U.S. PATENT DOCUMENTS

| | | | |
|---|---|---|---|
| 8,582,872 | B1 | 11/2013 | Ioffe et al. |
| 9,177,224 | B1* | 11/2015 | Heller ................... G06K 9/4671 |
| 9,519,918 | B2 | 12/2016 | Goswami et al. |
| 9,530,072 | B2 | 12/2016 | Dwan et al. |
| 9,633,251 | B2 | 4/2017 | Youngmin et al. |
| 9,697,234 | B1* | 7/2017 | Dhua ..................... G06N 7/005 |
| 9,734,164 | B2 | 8/2017 | Gan et al. |
| 10,282,431 | B1* | 5/2019 | Bhotika ................... G06F 16/54 |
| 2013/0125002 | A1* | 5/2013 | Spaeth .................. G06F 3/0482 715/731 |
| 2013/0339848 | A1 | 12/2013 | Patil et al. |
| 2014/0122300 | A1* | 5/2014 | Gonsalves ......... G06Q 30/0625 705/26.62 |
| 2014/0286566 | A1* | 9/2014 | Rhoads .................. G06T 5/001 382/154 |
| 2014/0314313 | A1* | 10/2014 | Kennedy ................. G06T 7/10 382/165 |
| 2015/0058160 | A1* | 2/2015 | Cao .................... G06Q 30/0631 705/26.7 |
| 2015/0169635 | A1* | 6/2015 | Jing ....................... G06F 16/50 707/723 |
| 2015/0169638 | A1 | 6/2015 | Jaber et al. |
| 2015/0169645 | A1* | 6/2015 | Li .......................... G06F 16/532 707/722 |
| 2015/0169978 | A1* | 6/2015 | Pillai ...................... G06K 9/622 382/195 |
| 2015/0178786 | A1* | 6/2015 | Claessens .......... G06Q 30/0269 705/14.66 |
| 2016/0019416 | A1* | 1/2016 | Noguchi ............. G06F 16/5838 382/190 |
| 2016/0253582 | A1 | 9/2016 | Di et al. |
| 2016/0253744 | A1* | 9/2016 | Masuko ................ G06F 3/0484 715/762 |
| 2017/0032185 | A1* | 2/2017 | Zhang .................. G06K 9/4661 |
| 2017/0178227 | A1* | 6/2017 | Graham ............... G06Q 10/087 |
| 2017/0286522 | A1* | 10/2017 | Hohwald ............. G06F 16/285 |
| 2018/0315108 | A1* | 11/2018 | Oh ........................ G06K 7/1417 |
| 2019/0347508 | A1* | 11/2019 | Hari ..................... G06K 9/6296 |
| 2020/0226411 | A1* | 7/2020 | Gupta ................... G06F 16/532 |

\* cited by examiner

PRODUCT IMAGE EVALUATION SYSTEM AND METHOD

RELATED APPLICATION

The present application claims the benefit of U.S. Provisional Application No. 62/646,170 filed Mar. 21, 2018, which is hereby incorporated herein in its entirety by reference.

TECHNICAL FIELD

Embodiments of the present disclosure relate generally to the field of product information systems, and more particularly to systems for providing product images for display to a user.

BACKGROUND

Online sales applications present product pages to customers including one or more images of the product. Customers can be strongly influenced to purchase by the product images available. Therefore, it is desirable to provide accurate and explanatory images to help customers make a purchasing decision.

Product information systems can generally provide a number of potential images for a product. Because these image sets can be automatically aggregated from a number of sources, curation is needed to generate useful sets of images that provide the information that the end user requires. Problems that can exist in sets of images displayed for a product can include too few images, too many images, duplicate (or near duplicate) images, irrelevant images, and placeholder images. Due to the large number of products available on most retail sites, it is not feasible for human reviewers to select optimized image sets. In addition, human reviewers may provide subjective or biased selections that are not optimized for customer needs.

Currently available image selection systems do not always present an optimal selection of images to influence a positive outcome on the part of a customer. In particular, currently available image deduplication systems do not take into account the desire to show multiple views of a product, and may eliminate useful views where the image data is similar, but the information provided is not.

A need exists, therefore, for a methodology that presents an optimal set of meaningful images in a meaningful order to the customer to convey maximum information about the product.

SUMMARY

Embodiments of the present disclosure enable management of product image data from disparate sources. Where different sellers and sources contribute product images, the resulting set of images may widely vary in quality and content. The data-driven approaches of the present disclosures can distill the superset of all available images to provide a set of images that are sufficiently different from each other and satisfy quality requirements. In other words, no images containing unique information are left behind, and images containing duplicate or irrelevant information are discarded. The steps to achieve this goal involve pairwise identification of near duplicate images, clustering the images into similar groups, and finally, selecting the best candidate from each group based on resolution, sharpness, coverage, relevance, and other factors.

In embodiments, a product image evaluation system comprises or interacts with a product database comprising a product information record that comprises a product identifier and a product category for a product, and an image database comprising a plurality of candidate images for the product. In embodiments the image database can comprise images received from a plurality of different sources. The system can comprise a parameterized grouping engine, an image selector, and an image sorter.

The grouping engine can be configured to produce one or more groups of similar images by performing a pairwise comparison between each pair of candidate images of the plurality of candidate images using at least one algorithm configured based on a parameter associated with the product category of the product. The parameter associated with the product category can be modified based on an input from a user or by studying example images from the category. The at least one algorithm can be selected from the group consisting of: a perception hash algorithm, a difference hash algorithm, a wavelet hash algorithm, an average hash algorithm, a cosine similarity algorithm, and a chi-square distance algorithm.

The image selector can be configured to produce a set of selected images by choosing a best image in each group of similar images based on one or more selection criteria related to the quality of the each similar image in group of similar images. The image sorter can be configured to produce an ordered list of product images for the product by ordering the set of selected images based on one or more sorting criteria related to the content of each selected image in the set of selected images. The selection criteria and sorting criteria can each be based on the product category.

In embodiments, the system can comprise an application interface configured to provide the ordered list of product images to a product sales application for display to a user on a product information screen.

The one or more selection criteria can be selected from the group consisting of: a resolution of the selected image, a sharpness of the selected image, and a coverage of a central object in the selected image. The one or more sorting criteria can be selected from the group consisting of: a content of the selected image, and a relevance of the selected image.

Embodiments can comprise an image preprocessor configured to produce a preprocessed output for each candidate image of the plurality of candidate images selected from the group consisting of: a trimmed image, a grayscale image, an edge enhanced image, and a red-green-blue (RGB) histogram.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
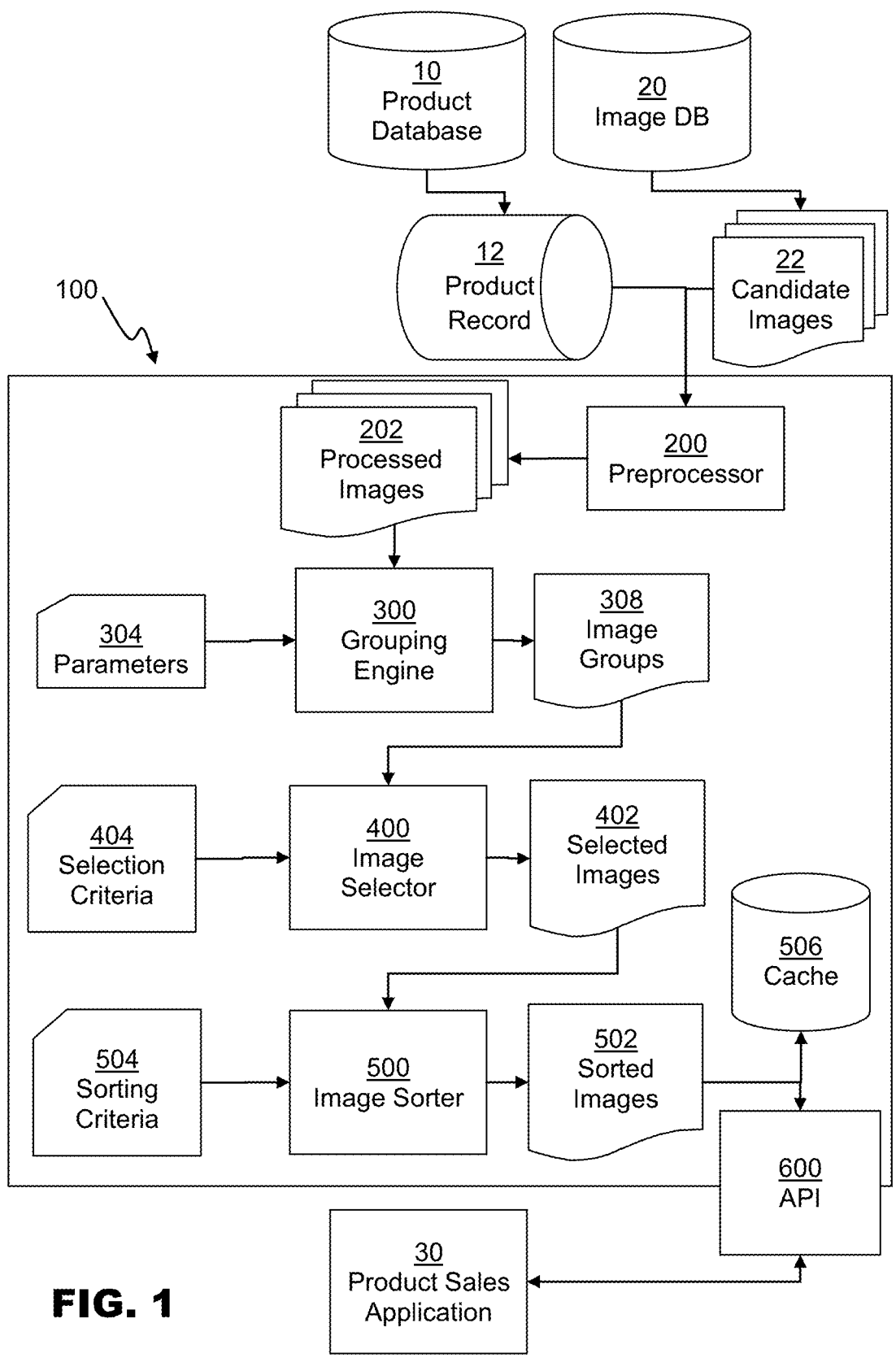
FIG. 1 is a schematic diagram depicting an architecture of an image selection system, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 is a schematic diagram depicting an architecture of image selection system 100, according to an embodiment. System 100 can comprise preprocessor 200, parameterized grouping engine 300, image selector 400, and image sorter 500. System 100 can receive product information from product database 10 and candidate images 22 for each product from image database 20. System 100 can produce an ordered list of sorted images 502 based on a product record 12 and associated candidate images 22. System 100 can provide sorted images 502 to a product sales application 30.

Figure 2:
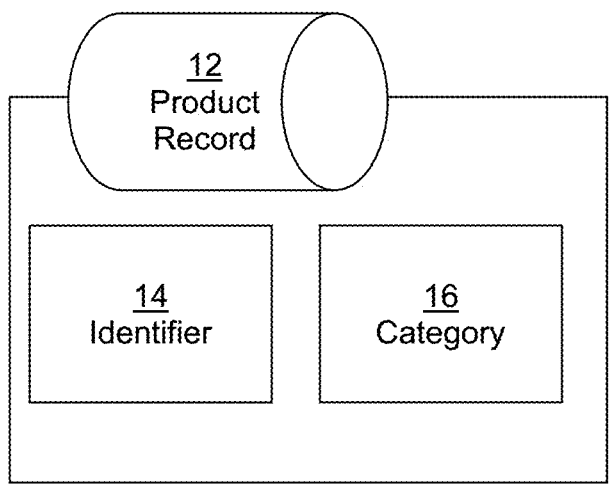
FIG. 2 is a schematic diagram depicting a data structure of a product record, according to an embodiment.

FIG. 2 is a schematic diagram depicting the structure of a product record 12. Product database 10 can comprise one or more product data repositories that can be queried to provide a product record 12 comprising a product identifier 14 and a product category 16. Image database 20 can comprise one or more image repositories that can be queried to provide one or more candidate images 22 that are associated with a given product record 12. Candidate images 22 can be provided in any image storage format known in the art such as Graphics Interchange Format (GIF), Portable Network Graphics (PNG), Tagged Image File Format (TIFF), Bitmap (BMP), Joint Photographic Experts Group (JPEG), and the like.

Product database 10 and image database 20 can be incorporated within image selection system 100, or can be external components, in embodiments. Product database 10 and image database 20 can be integrated into a single data store, or software service, such that a product record 12 can be provided with candidate images 22, or links to the storage location for candidate images 22.

Figure 3:
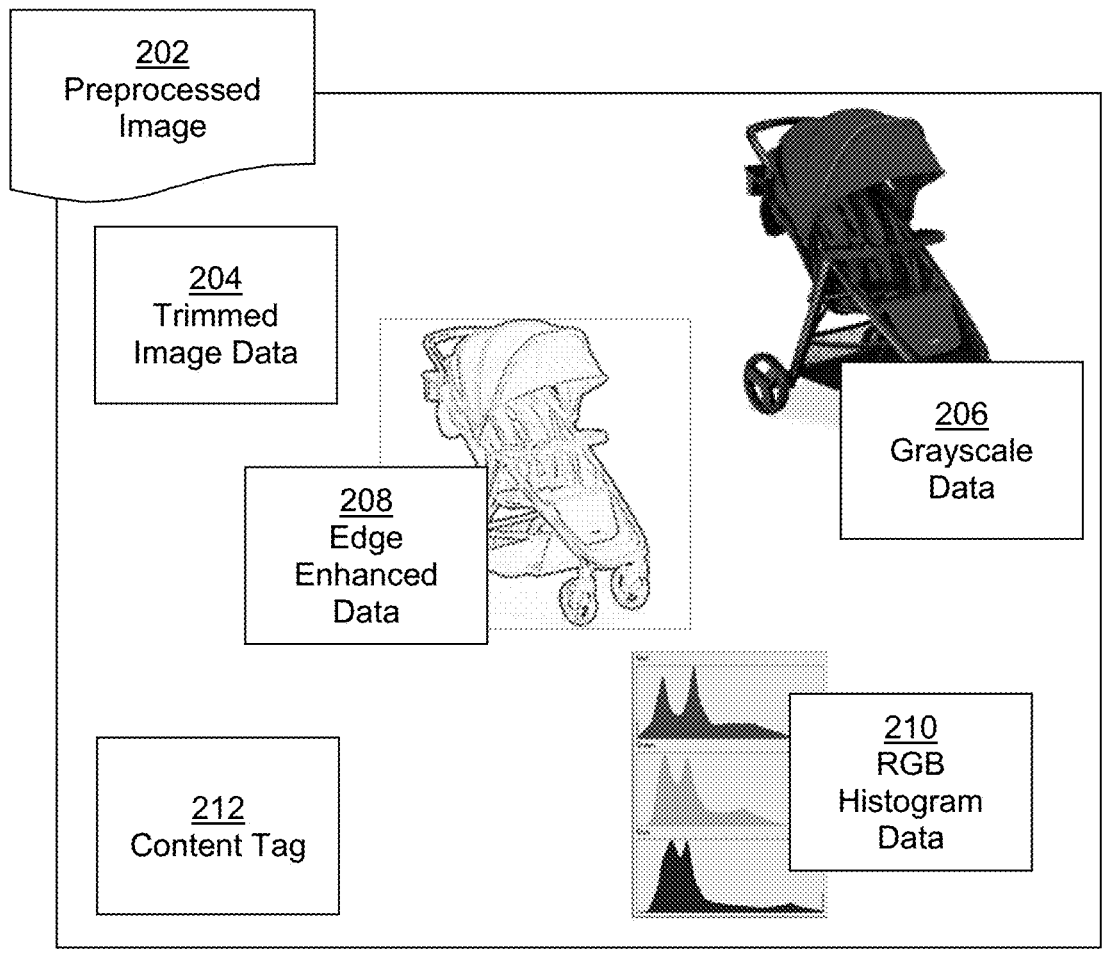
FIG. 3 is a schematic diagram depicting a data structure of a preprocessed image, according to an embodiment.

Preprocessor 200 can receive one or more candidate images 22 and provide preprocessed images 202. FIG. 3 is a schematic diagram depicting the structure of a preprocessed image 202 according to an embodiment. Preprocessed image 202 can comprise one or more data sets resulting from processing operations performed on candidate images 22. Other components of system 100 such as grouping engine 300, image selector 400 and image sorter 500 can use components of preprocessed image 202, such that certain processing operations are not redundantly executed at multiple points in the image selection process.

Preprocessed image 202 can comprise trimmed image data 204. Preprocessor 200 can execute one or more whitespace detection methods known in the art to determine if candidate image 22 contains external whitespace or other extraneous image data that can be cropped while preserving the central focus of the image. Trimming can enable more robust image comparison where two images share the same central features, but have different border regions. Trimmed image data 204 can comprise a cropped version of candidate image 22, if cropping is appropriate.

Preprocessor 200 can use one or more desaturation techniques known in the art to produce grayscale image data 206. Preprocessor 200 can similarly produce edge enhanced image data 208 and RGB histogram data 210. Preprocessor 200 can comprise or interface with one or more standard image processing libraries in order to produce the various components of preprocessed image 202.

In embodiments, preprocessed image 202 can further comprise content tags 212. Content tags 212 can indicate which view or views of the depicted product are represented in candidate image 22, as well as other information about the content of the image. The available content tags can vary based on the product category. For example, in an embodiment, candidate images for a product in a "shirt" category may have content tags 212 including: front, back, front-modeled, back-modeled, and the like. Similarly, candidate images for a product in a "television" category can have content tags 212 including: front view with the screen on, and front view with the screen off, and the like. Content tags can be shared across categories in embodiments, for example multiple categories may have products including the "close-up" tag.

Preprocessor 200 can comprise a user interface enabling human or machine-intelligence tagging of image contents. For example, preprocessor 200 can provide a display of one or more candidate images 22 and request that a user assign one or more content tags to each image. In one embodiment, preprocessor 200 can attempt to detect the content based on one or more characteristics of candidate image 22. The automatic content detection can be modified or tuned based on feedback provided by human users, or other content detection systems. Automatic content detection can be performed through the use of one or more deep learning models, such as Keras models. In particular, Inception, Visual Geometry Group (VGG) 16-layer, VGG 19 layer, and Resnet networks can be used. In yet another embodiment, content tags 212 can be provided with candidate image 22.

Figure 4:
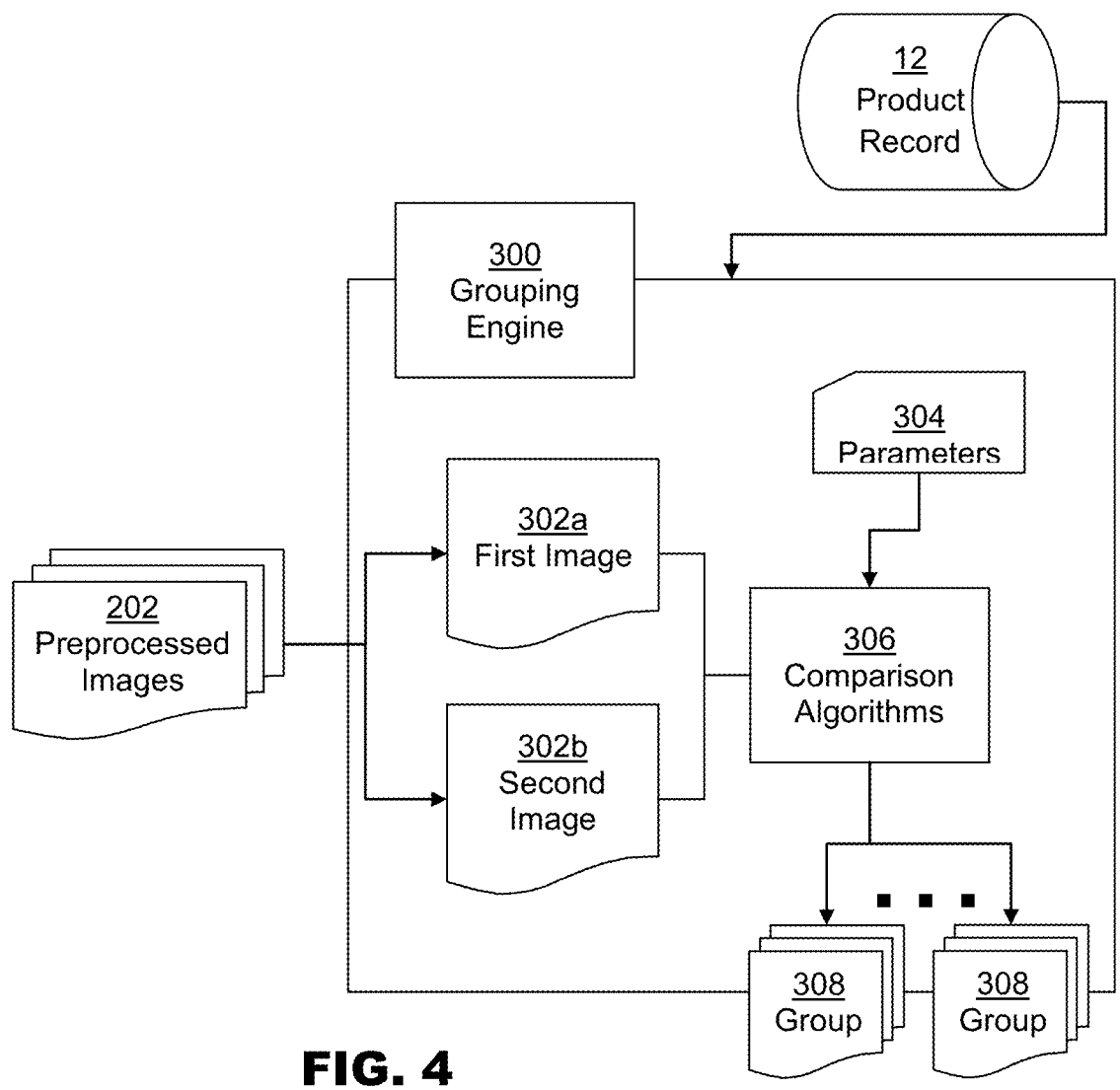
FIG. 4 is a schematic diagram depicting an architecture of a grouping engine, according to an embodiment.

FIG. 4 is a schematic diagram depicting the structure of grouping engine 300, according to an embodiment. Grouping engine 300 can store or receive one or more product category specific parameters 304. Grouping engine can comprise one or more comparison algorithms 306, each configured to provide a result indicating whether a first image 302a is a duplicate or near-duplicate of a second image 302b based on one or more parameters 304. Grouping engine 300 can execute each comparison algorithm 306 for each pair of images 302 for a product record 12 to create one or more groups 308 of duplicate images. Based on the parameters 304 for each product category, the images 302 in each group 308 may not be strictly identical. In other words, each group 308 may contain multiple images 202 that are near-duplicates, as well as strict duplicates. In embodiments, grouping engine 300 can assign images with differing content tags 212 to different groups.

Comparison algorithms 306 can comprise various image comparison algorithms known in the art that can provide a probability or other measure of similarity between two or more images. Comparison algorithms 306 can return true/false values indicating whether the input images are match, or a probability value range from 0 to 1, though other ranges or indicators can be used. Each comparison algorithm 306 can further receive one or more parameters 304, such as threshold parameters. In embodiments, comparison algorithms 306 can each comprise a perception hash algorithm, difference hash algorithm, wavelet hash algorithm, average hash algorithm, cosine similarity algorithm, chi-square distance algorithm, or the like. Each comparison algorithm 306 can use one or more parts of preprocessed images 202 in order to make comparison determinations. For example, the RGB histograms of images 302a and 302b can be compared using both a difference hash algorithm and a cosign similarity algorithm, or any other combination of comparison algorithms 306. In one embodiment, the RGB histogram data 210 can be used by a chi-square distance algorithm, the edge enhanced data 208 can be used by a difference hash algorithm, and the full color trimmed image data 204 can be used by a perception hash algorithm, and one or more deep learning models.

In embodiments, parameters 304 can comprise a different set of values for each algorithm 306. In addition, parameters 304 can comprise weighting factors to be used when evaluating the results of each comparison algorithm 306.

In one embodiment, one or more machine-learning (or "deep-learning") models can be trained to determine values for parameters 304 based on training sets comprising images in each category. One training method can comprise assembling a number of image pairs (for example, a few hundred), some of which are near-duplicates and others are different. Comparison algorithms 306 can be executed multiple times with varying parameters 304, and each parameter set can be evaluated in terms of accuracy, precision, recall, and F1 score (the weighted average of precision and recall). An optimal set of parameters 304 for each category can be chosen based on the results (for example, by selecting the parameter set with the highest combined F1 score and accuracy, or other optimization method).

Grouping engine 300 can utilize one or more machine-learning models to determine parameters 304. In embodiments, one or more groups 308 produced for a product record 12 can be evaluated by a human or machine user for accuracy. Grouping engine 300 can use the feedback received to modify one or more parameters 304 in order to increase grouping accuracy. For example, if grouping engine 300 receives feedback indicating that a cosine similarity algorithm is biased towards inappropriately grouping images that are very different, the threshold used for the cosine similarity algorithm can be decreased. In another example, if a particular algorithm is poor at discriminating differences for a certain product category, the output of that algorithm can be given a lower weight when evaluating images for that product category. In embodiments, grouping engine 300 can comprise one or more deep-learning models such as those discussed with respect to preprocessor 200 above. In particular models such as Inception, Visual Geometry Group (VGG) 16-layer, VGG 19 layer, and Resnet networks can be used.

Those of ordinary skill in the art will recognize that image comparison algorithms can vary in effectiveness based on various characteristics of the input images. In embodiments, these deficiencies are mitigated by evaluating the results of multiple comparison algorithms 306 and by tuning the parameters used by each comparison algorithm 306 (and the evaluation of results) by product category.

Figure 5:
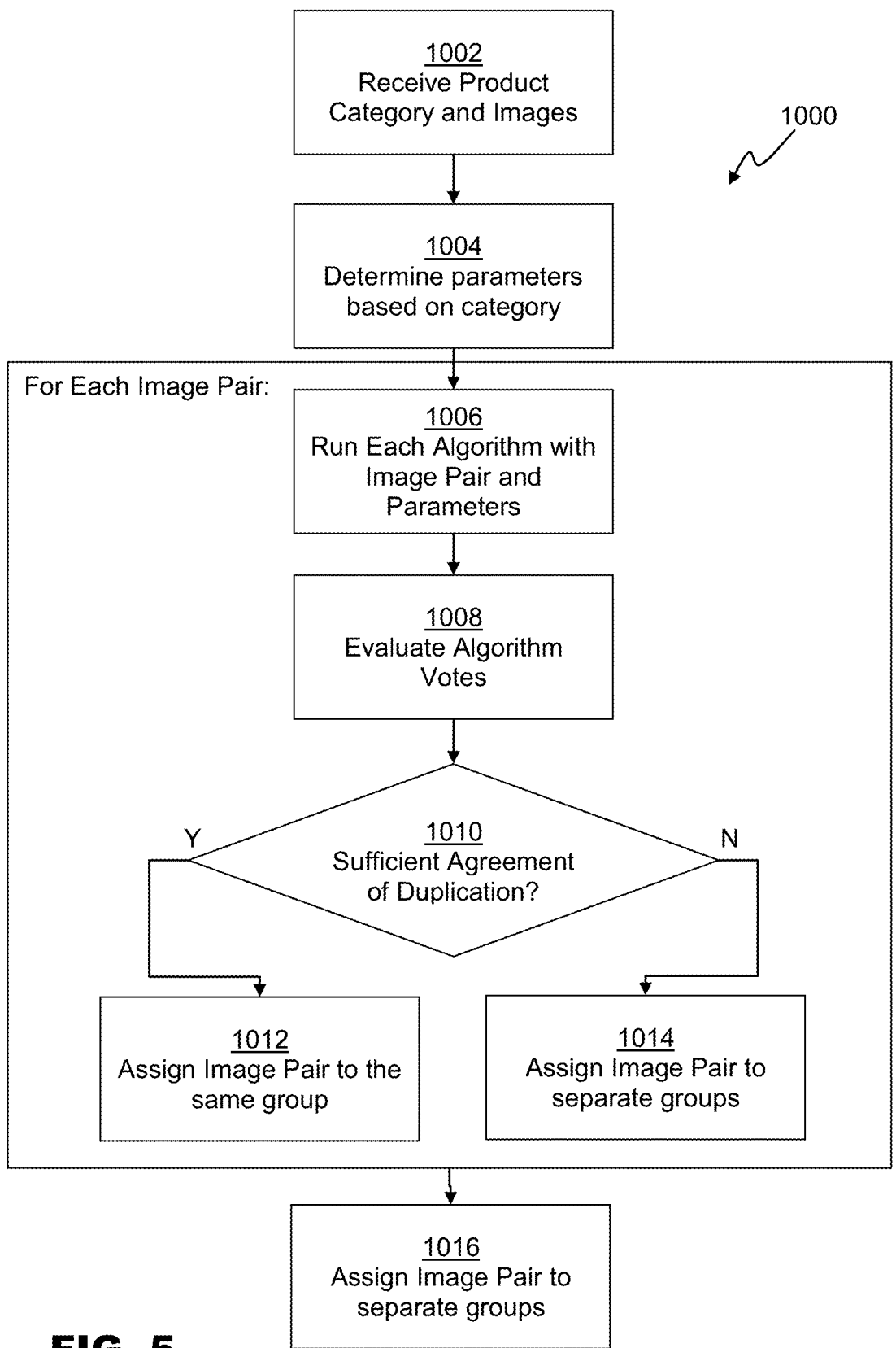
FIG. 5 is a flowchart depicting a method of grouping images, according to an embodiment.
Figure 6:
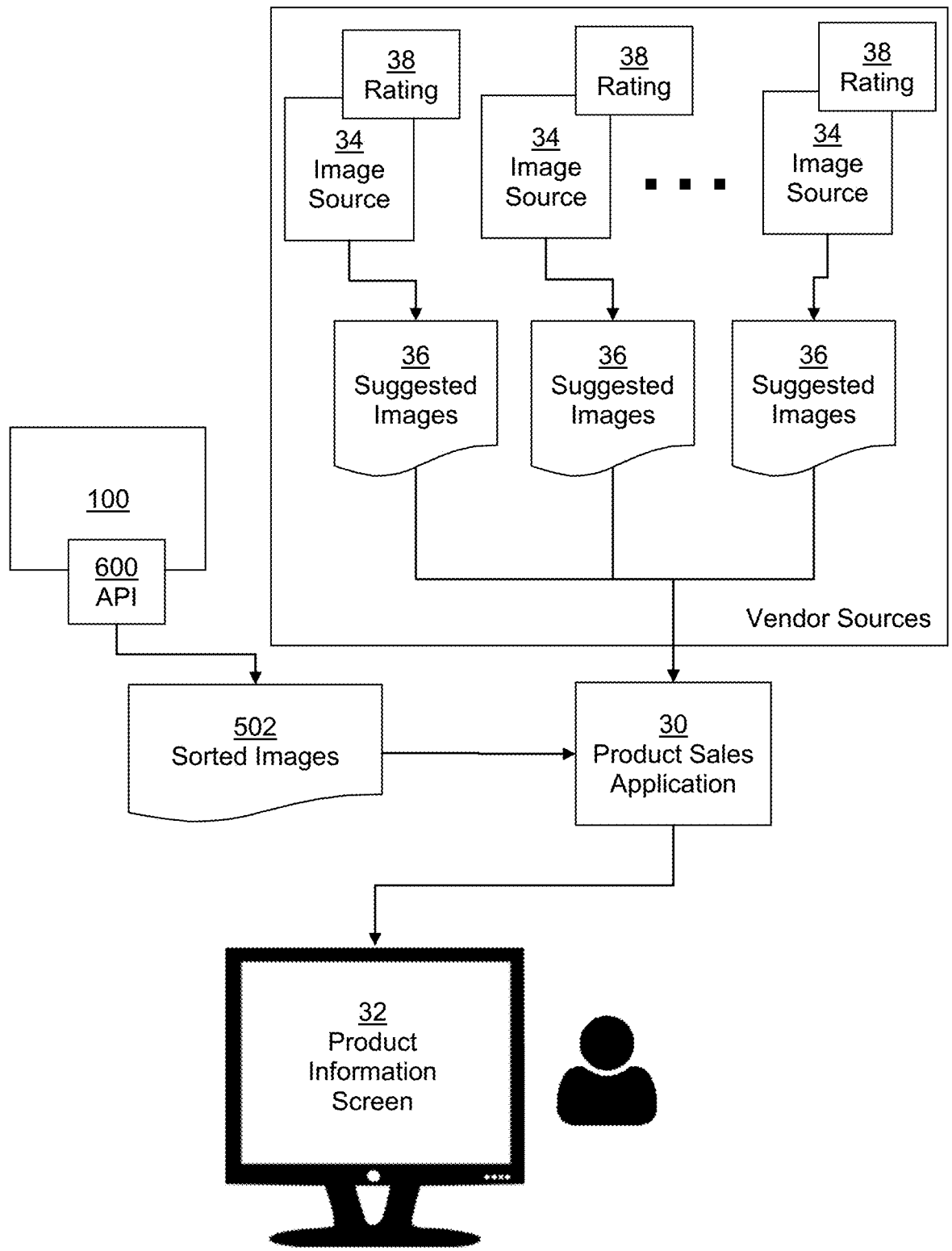
FIG. 6 is a schematic diagram depicting an architecture of a product sales application, according to an embodiment.

FIG. 5 is a flowchart depicting a method 1000 for grouping preprocessed images 202. At 1002, the product record 12 including product category 16 and the preprocessed images 202 can be received. At 1004, parameters 304 can be determined based on the product category.

For each pair of images 302a and 302b in the set of preprocessed images 202, each comparison algorithm 306 can be executed with the appropriate parameters 304. At 1008, the results of each comparison algorithm 306 can be evaluated. The evaluation can be based on: the number of comparison algorithms 306 that report that the images are nearly identical, the sum (or other mathematical aggregation) of values returned from the comparison algorithms, or other methods. The evaluation can incorporate category-specific weights for each comparison algorithms. For example, in one embodiment, perception hash algorithm results can be discounted or completely ignored for particular product categories.

If, at 1010, the evaluation establishes that the pair of candidate images is sufficiently similar, they can be assigned to the same group at 1012. If one of image 302a or 302b is already assigned to a group, the other image can be assigned to the same group. If both of images 302a and 302b are assigned to groups, two groups can be combined. Otherwise, the pair of candidate images can be assigned to separate groups at 1014.

At 1016, grouping data can be returned. Grouping data can comprise a set of groups 308, each group 308 comprising image data, or a reference to the storage location of the image data. Grouping data can also comprise an annotation comprising an identifier for a group 308 associated each image 202. Other data formats can be used in embodiments.

Image selector 400 can receive groups 308, and return one or more selected images 402 for each group. Image selector 400 can receive or determine one or more selection criteria 404 related to the quality of each image in the group. Selection criteria 404 can be global or vary by product category 16. Selection criteria 404 can comprise one or more of: image size, image sharpness, image resolution, and a coverage level of the product, or other central object in the image. In one embodiment, image selector 400 can also eliminate any images or groups 308 featuring placeholder images.

Image sorter 500 can receive selected images 402 and produce sorted images 502. Image sorter 500 can determine a sorting order for selected images 402 based on one or more sorting criteria 504. Sorting criteria 504 can be global or vary by product category. Sorting criteria can be based on the content tag 212 of the image, and/or one or more indications of a relevance level of the image. For example, one sorting criteria can instruct image sorter 500 to rank images having a "front" content tag higher than images having a "back" content tag. In another example, it may be determined that for a certain product category, such as "Men's Shirt," modeled images are less relevant than images without a model. The opposite might be true for a product category such as "Women's Shirt."

In embodiments, sorting criteria can also vary based on data received by image sorter 500 regarding the intended use of the image. For example, the preferred sorting order may change if the images are to be displayed to a user for general advertising purchases, as opposed to images displayed to a user at a screen having an add-to-cart function.

Sorted images 502 can be stored in association with product record 12. In embodiments, image data for sorted images 502 can be stored with product record 12 in product database 10, or in a cache 506 maintained by system 100. In embodiments, image data, or references to the storage location for sorted images 502 can reside in a data repository such that they can be retrieved based on a product identifier 14.

The processing performed by the various components of system 100 can be performed on an as-needed basis, such that the sorted images 502 are determined in response to a request for a given product record 12, and not stored. In one embodiment, system 100 can be configured to execute in a batch mode, such that the sorted images 502 for a set of product records 12 can be determined and stored before a particular request is made. A combination of real-time, or near-real-time processing and batch processing can also be supported, such that system 100 can provide sorted images 502 on request, and save sorted images 502 in order to save processing time in the future. As another example, preprocessor 200 can be executed at any time to produce and store preprocessed images 202, which can be used to respond to individual requests when needed.

API 600 can enable a user (human or programmatic) to access the sorted images 502 for a product record 12. In one embodiment, API 600 can receive a product record 12 and return an ordered list of product images to a product sales application for display to a user on a product information screen. API 600 can determine if sorted images 502 exist in product database 10 or cache 506 for product record 12. If no sorted images 502 exist, API 600 can return an error or other informational message.

API 600 can enable integration of system 100 with existing product information applications. In one embodiment, a product sales application 30 can be configured to generate a product information screen 32 for display to a user. Product information screen 32 comprises a web page, graphical user interface (GUI) screen, or other display interface viewable by a user. Product information screen 32 can include data from product record 12, and one or more images selected from a variety of image sources 34. Image sources 34 can each provide a sorted list 36 of product images associated with product record 12. Product sales application 30 can maintain a rating value 38 for each image source 34. For example, each image source 34 can be associated with a known third party vendor, and rating values 38 can be assigned based on various measures of vendor trustworthiness, including quality of previously provided images, number of products provided, and the like. API 600 can provide an interface emulating that of image sources 34, such that an existing product sales application 30 can receive the sorted images 502 product by system 100. Product sales application 30 can be configured to assign API 600 a high rating value 38, such that where sorted images 502 are available, sorted images 502 will be selected before those provided by other vendors or image sources 34. API 600 can therefore enable selective implementation of system 100 for product categories or individual products for which system 100 is most valuable.

Those of ordinary skill in the art will recognize that product sales application 30 is just one example of an application or user of system 100. System 100 can be configured to interact with other applications or workflows to provided sorted images.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A product image evaluation system comprising:
    a product database comprising a product information record that comprises a product identifier and a product category for a product;
    an image database comprising a plurality of candidate images for the product, wherein each candidate image of the plurality of candidate images comprises a respective different view of the product;
    a parameterized grouping engine configured to produce one or more groups of similar images by performing, using one or more processors, a pairwise comparison between each pair of candidate images of the plurality of candidate images using at least one algorithm configured based on a parameter associated with the product category of the product, wherein each one of the one or more groups of similar images comprises a particular respective different view of the product;
    an image selector configured to produce a set of selected images by choosing, using the one or more processors, a best image of the respective different view of the product in each group of similar images of the one or more groups of similar images based on one or more selection criteria related to a quality of each similar image in the each group of similar images; and
    an image sorter configured to produce an ordered list of the set of selected images for the product by ordering, using the one or more processors, the set of selected images based on one or more sorting criteria related to respective content of each selected image in the set of selected images.

2. The system of claim 1, further comprising an application interface configured to provide the ordered list of product images to a product sales application for display to a user on a product information screen.

3. The system of claim 1, wherein the at least one algorithm is selected from the group consisting of:
    a perception hash algorithm, a difference hash algorithm, a cosine similarity algorithm, and a chi-square distance algorithm.

4. The system of claim 1, wherein at least one of the one or more selection criteria is based on the product category.

5. The system of claim 1, wherein at least one of the one or more sorting criteria is based on the product category.

6. The system of claim 1, wherein at least one of the one or more selection criteria is selected from the group consisting of:
    a resolution of a selected image, a sharpness of a selected image, and a coverage of a central object in a selected image.

7. The system of claim 1, wherein at least one of the one or more sorting criteria is selected from the group consisting of:
    a content tag of a selected image, and a relevance of a selected image.

8. The system of claim 1, further comprising an image preprocessor configured to produce a preprocessed output for each candidate image of the plurality of candidate images, using the one or more processors, selected from the group consisting of:
    a trimmed image, a grayscale image, an edge enhanced image, and a red-green-blue (RGB) histogram.

9. The system of claim 1, wherein the parameter associated with the product category can be modified based on an input from a user.

10. The system of claim 1, wherein the image database comprises images received from a plurality of sources.

11. A method for evaluating and selecting images for a product comprising:
    receiving a plurality of candidate images for the product, wherein each candidate image of the plurality of candidate images comprises a respective different view of the product;
    producing one or more groups of similar images by performing a pairwise comparison between each pair of candidate images of the plurality of candidate images using at least one algorithm configured based on a parameter associated with a product category of the product, wherein each one of the one or more groups of similar images comprises a particular respective different view of the product;

producing a set of selected images by choosing a best image of the respective different view of the product in each group of similar images of the one or more groups of similar images based on one or more selection criteria related to a quality of each similar image in the each group of similar images; and producing an ordered list of the set of selected images by ordering the set of selected images based on one or more sorting criteria related to respective content of each selected image in the set of selected images.

12. The method of claim 11, further comprising providing the ordered list of product images to a product sales application for display to a user on a product information screen.

13. The method of claim 11, wherein the at least one algorithm is selected from the group consisting of:

a perception hash algorithm, a difference hash algorithm, a cosine similarity algorithm, and a chi-square distance algorithm.

14. The method of claim 11, wherein at least one of the one or more selection criteria is based on the product category.

15. The method of claim 11, wherein at least one of the one or more sorting criteria is based on the product category.

16. The method of claim 11, wherein at least one of the one or more selection criteria is selected from the group consisting of:

a resolution of a selected image, a sharpness of a selected image, and a coverage of a central object in a selected image.

17. The method of claim 11, wherein at least one of the one or more sorting criteria is selected from the group consisting of:

a content tag of a selected image, and a relevance of the selected image.

18. The method of claim 11, further comprising producing a preprocessed output for each candidate image of the plurality of candidate images selected from the group consisting of:

a trimmed image, a grayscale image, an edge enhanced image, and a red-green-blue (RGB) histogram.

19. The method of claim 11, wherein the parameter associated with the product category can be modified based on an input from a user.

20. The method of claim 11, wherein the candidate images are received from a plurality of sources.

* * * * *